July 7, 1925.
F. W. KURTH
BICYCLE PROPELLING MECHANISM
Filed Feb. 8, 1924
1,545,333
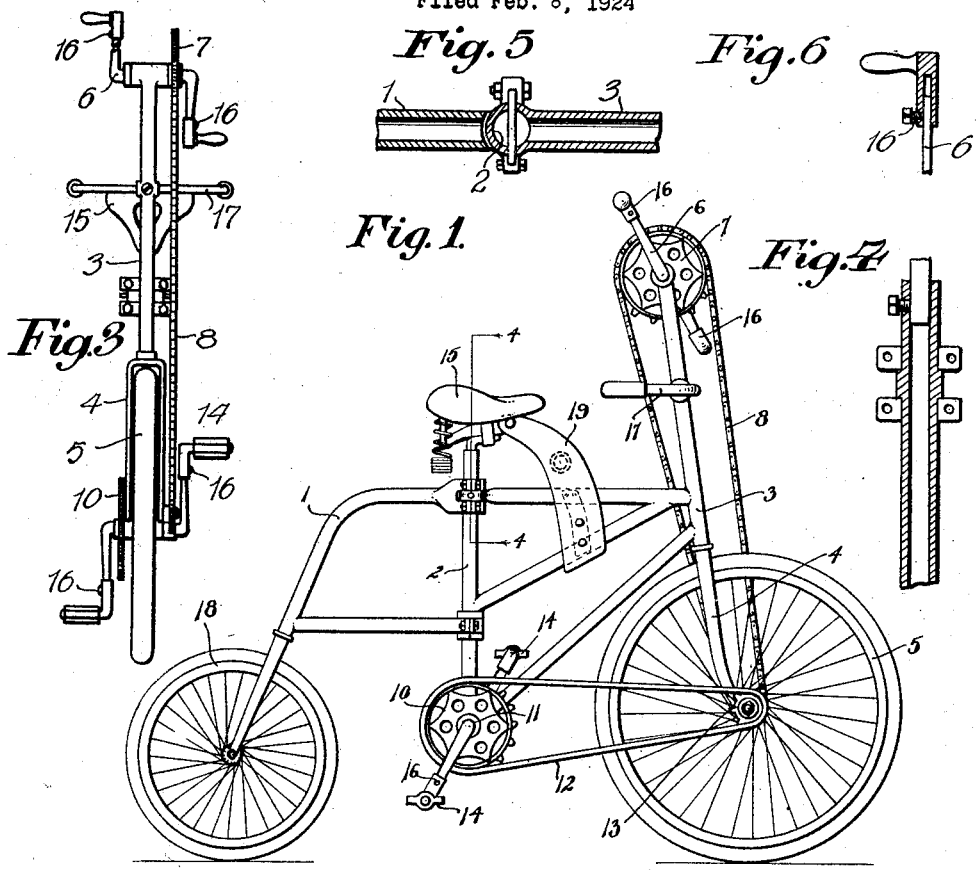
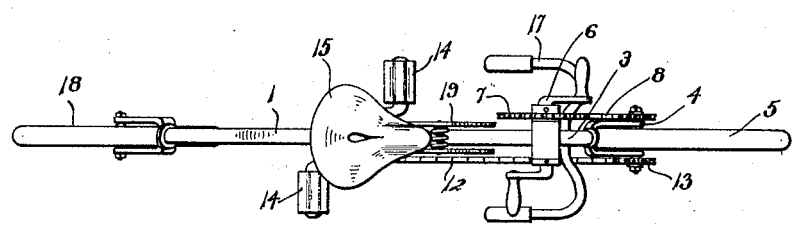
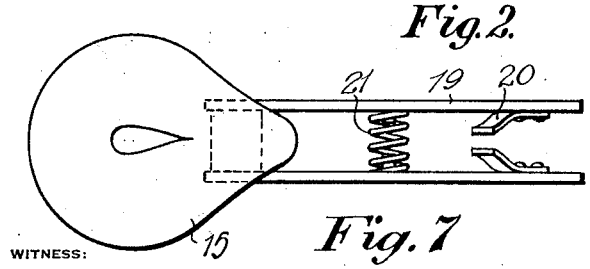
F. W. Kurth.
INVENTOR
BY Victor J. Evans.
ATTORNEY Patented July 7, 1925.

1,545,333

UNITED STATES PATENT OFFICE.

FRED W. KURTH, OF FARMINGDALE, NEW JERSEY.

BICYCLE PROPELLING MECHANISM.

Application filed February 8, 1924. Serial No. 691,453.

*To all whom it may concern:*

Be it known that I, FRED W. KURTH, a citizen of the United States, residing at Farmingdale, in the county of Monmouth and State of New Jersey, have invented new and useful Improvements in Bicycle Propelling Mechanism, of which the following is a specification.

This invention relates to a bicycle, the general object of the invention being to provide means whereby the bicycle can be propelled by both the feet and the hands by means of pedals adapted to be driven by the feet and attached to the drive wheel and by means of cranks adapted to be engaged by the hands and connected with the drive wheel.

Another object of the invention is to provide a seat which is attached to a vertical rotary rod which forms the pivot of the steering part of the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.
Figure 2 is a plan view.
Figure 3 is a front end view.
Figure 4 is a section on line 4—4 of Figure 1.
Figures 5 and 6 are detail views.
Figure 7 is a plan view of the seat and the plates attached thereto.

In these views 1 indicates a rear frame, in which is pivotally supported a vertical rod 2 and a front frame 3 is connected with this vertical rod 2. The front frame includes a forked bar 4 which carries the front wheel 5 and in which is journaled a double crank 6, this crank being arranged at the upper end of the bar. A sprocket 7 is arranged on the central part of the crank and this sprocket is connected by a chain 8 with a sprocket on the hub of the wheel 5. A sprocket 10 is mounted on a shaft 11 arranged at the lower end of the vertical bar 2 and a chain 12 connects this sprocket 10 with a sprocket 13 on the wheel 5. Pedals 14 are connected with the sprocket 10. A seat 15 is arranged on the upper end of bar 2 and the parts are so arranged that a person sitting on the seat can work the pedals 14 by his feet and the double cranks 6 by his hands so that he can use both his hands and feet in propelling the device or he can propel the device by his feet or hands as desired.

The handle parts of the cranks 6 are made adjustable, as shown at 16, and the pedals can also be made adjustable so as to suit persons of various sizes. Handle bars 17 may be connected with the upright bar 3 to be used when the crank 6 is not being used. The rear wheel 18 is carried by the rear frame, as shown.

A pair of plates 19 depend downwardly from the seat and extend one on each side of the front part of the frame. These plates are of spring metal and they are provided with the leaf springs 20 for engaging a portion of the frame and a coil spring 21 acts to hold the plates apart. By pressing these plates with the knees the operator can shift the frame 3 to steer the vehicle in making a turn to one side or the other. Considerable practice is necessary before a person can ride this bicycle. The hands have to act with the body to turn it and the steering is done by twisting the hips from left to right or from right to left. As this is being done one hand pulls and the other gives a push on the handle bars and the whole body swings to the right to keep the balance, when turning to the left. When turning towards the right, the weight of the body swings to the left. The rear wheel keeps it from wobbling.

This device will be excellent in giving the body exercise as both the legs and arms are used in propelling the device. The parts can be adjusted so that the body will remain straight. By providing means for driving it both by the hands and feet the device can be driven at great speed and can be easily driven uphill. The saddle turns with the front frame and this frame permits the device to take turns very easily. The device can be braked by holding back the hand pedal.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A bicycle of the class described comprising a rear frame, a vertical bar pivoted therein, a front frame connected with the vertical bar, a seat carried by the vertical bar, a front wheel carried by the front frame, a rear wheel carried by the rear frame pedal means connected with the front wheel and carried by the vertical bar for propelling the device by the feet, a hand operated device connected with the front wheel and carried by the front part of the front frame for propelling the device by the hands, a handle bar connected with the front frame and knee engaging members connected with the seat and depending downwardly on each side of the front frame for enabling the operator to steer the device by his knees.

2. A bicycle of the class described comprising a rear frame, a vertical bar pivoted therein, a front frame connected with the vertical bar, a seat carried by the vertical bar, a front wheel carried by the front frame, a rear wheel carried by the rear frame, means for propelling the device by either the hands or feet or both, such means consisting of pedals connected with the front wheel and hand operated cranks carried by the front frame and connected with the front wheel.

In testimony whereof I affix my signature.

FRED W. KURTH.